(12) United States Patent
Nagasaka et al.

(10) Patent No.: US 10,369,867 B2
(45) Date of Patent: Aug. 6, 2019

(54) APPARATUS AND METHOD FOR DRIVING A SWITCHING ELEMENT, AND A VEHICLE AIR-CONDITIONING APPARATUS

(71) Applicant: MITSUBISHI HEAVY INDUSTRIES THERMAL SYSTEMS, LTD., Minato-ku, Tokyo (JP)

(72) Inventors: Keiji Nagasaka, Tokyo (JP); Hideo Nakamura, Tokyo (JP); Koji Nakano, Tokyo (JP); Masatoshi Morishita, Tokyo (JP); Shunsuke Yakushiji, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 814 days.

(21) Appl. No.: 14/911,816

(22) PCT Filed: Sep. 3, 2014

(86) PCT No.: PCT/JP2014/073127
§ 371 (c)(1),
(2) Date: Feb. 12, 2016

(87) PCT Pub. No.: WO2015/060019
PCT Pub. Date: Apr. 30, 2015

(65) Prior Publication Data
US 2016/0200171 A1    Jul. 14, 2016

(30) Foreign Application Priority Data
Oct. 25, 2013 (JP) .................... 2013-222406

(51) Int. Cl.
*B60H 1/00* (2006.01)
*B60H 1/14* (2006.01)
(Continued)

(52) U.S. Cl.
CPC ........... *B60H 1/22* (2013.01); *B60H 1/00385* (2013.01); *B60H 1/00907* (2013.01);
(Continued)

(58) Field of Classification Search
CPC ...... B60H 1/22; B60H 1/00907; B60H 1/143; B60H 1/00921; B60H 1/00385;
(Continued)

(56) References Cited

U.S. PATENT DOCUMENTS 6,353,354 B1 * 3/2002 Detweiler ................. H02J 1/10
327/110
7,555,912 B2 * 7/2009 Schnetzka ............. F25B 49/025
318/801

(Continued)

FOREIGN PATENT DOCUMENTS

| CN | 101434184 A | 5/2009 |
|---|---|---|
| CN | 102312829 A | 1/2012 |

(Continued)

OTHER PUBLICATIONS

Office Action dated Mar. 3, 2017 for corresponding Chinese Patent Application No. 201480045557.5 with an English Translation.

*Primary Examiner* — Ljiljana V. Ciric
(74) *Attorney, Agent, or Firm* — Birch, Stewart, Kolasch & Birch, LLP (57) ABSTRACT

A drive apparatus providing a heat source and driving a switching element, along with a corresponding method of using the drive apparatus. The switching element includes a transistor having a high-heat resistant semiconductor including silicon carbide. The drive apparatus is provided with a voltage adjusting unit that varies a drive voltage to be applied to a conduction control terminal of the switching element in order to put the switching element in an ON state, and the voltage adjusting unit applies, as the drive voltage, (Continued)

a voltage in an active region of the transistor to the conduction control terminal.

5 Claims, 8 Drawing Sheets

(51) Int. Cl.
*B60H 1/22* (2006.01)
*H02M 1/08* (2006.01)
*H02P 27/06* (2006.01)

(52) U.S. Cl.
CPC ......... *B60H 1/00921* (2013.01); *B60H 1/143* (2013.01); *H02M 1/08* (2013.01); *H02P 27/06* (2013.01); *B60H 2001/00949* (2013.01); *B60H 2001/2262* (2013.01)

(58) Field of Classification Search
CPC . B60H 2001/2262; B60H 2001/00949; H02M 1/08; H02P 27/06
See application file for complete search history.

(56) References Cited

U.S. PATENT DOCUMENTS

| | | | | |
|---|---|---|---|---|
| 8,674,651 | B2* | 3/2014 | Ioannidis | H02M 7/003 318/801 |
| 8,830,711 | B2* | 9/2014 | Lai | H02M 7/797 363/132 |
| 8,848,405 | B2* | 9/2014 | Temesi | H02M 7/483 363/131 |
| 8,866,342 | B2* | 10/2014 | Iwata | H02M 7/49 307/82 |
| 8,908,402 | B2* | 12/2014 | Kopf | H02M 7/539 363/71 |
| 8,988,915 | B2* | 3/2015 | Ku | H02M 7/53871 363/132 |
| 9,024,559 | B2* | 5/2015 | Adiga-Manoor | H02P 27/06 318/400.3 |
| 9,444,389 | B2* | 9/2016 | Kadry | H02P 27/06 |
| 10,191,531 | B2* | 1/2019 | Zhang | G06F 1/324 |
| 2002/0176261 | A1* | 11/2002 | Norrga | H02M 7/758 363/17 |
| 2003/0133317 | A1* | 7/2003 | Norrga | H02M 5/297 363/127 |
| 2003/0168919 | A1* | 9/2003 | Friedrichs | H03K 17/102 307/113 |
| 2003/0231518 | A1* | 12/2003 | Peng | H02M 7/48 363/98 |
| 2004/0008005 | A1* | 1/2004 | Sakai | H02P 1/16 318/801 |
| 2004/0012986 | A1* | 1/2004 | Riggio | H02M 1/4225 363/26 |
| 2004/0239278 | A1 | 12/2004 | Kobayashi et al. | |
| 2005/0190511 | A1* | 9/2005 | Crane | H02H 7/0833 361/23 |
| 2006/0208685 | A1* | 9/2006 | Schnetzka | H02H 9/001 318/800 |
| 2007/0063668 | A1* | 3/2007 | Schnetzka | H02J 9/062 318/812 |
| 2007/0151272 | A1* | 7/2007 | Cosan | F25B 49/025 62/228.1 |
| 2009/0109713 | A1* | 4/2009 | Schnetzka | H02M 5/4585 363/34 |
| 2009/0296441 | A1* | 12/2009 | Klemt | H02M 1/088 363/131 |
| 2012/0001575 | A1 | 1/2012 | Kubo | |
| 2012/0201066 | A1* | 8/2012 | Dubois | F16H 15/305 363/127 |
| 2012/0218795 | A1* | 8/2012 | Mihalache | H02M 7/487 363/97 |
| 2012/0267355 | A1 | 10/2012 | Trapp et al. | |
| 2013/0044527 | A1* | 2/2013 | Vracar | H02M 7/487 363/131 |
| 2013/0094265 | A1* | 4/2013 | Lai | H02M 7/487 363/131 |
| 2013/0121033 | A1* | 5/2013 | Lehn | H02M 3/335 363/17 |
| 2013/0180273 | A1 | 7/2013 | Hatakeyama et al. | |
| 2014/0375242 | A1* | 12/2014 | Briere | H01L 27/0207 318/494 |
| 2015/0016169 | A1* | 1/2015 | Honea | H02M 7/5387 363/132 |
| 2015/0084611 | A1* | 3/2015 | Agrawal | H02M 3/158 323/282 |
| 2015/0089972 | A1 | 4/2015 | Kamiya et al. | |
| 2015/0311776 | A1* | 10/2015 | Lavieville | H02M 7/487 363/65 |
| 2016/0116925 | A1* | 4/2016 | Freeman | H02M 3/33546 307/130 |
| 2017/0373586 | A1* | 12/2017 | Zhang | H02M 7/5395 |

FOREIGN PATENT DOCUMENTS

| | | |
|---|---|---|
| CN | 102668691 A | 9/2012 |
| EP | 2 629 029 A1 | 8/2013 |
| JP | 2004-357384 A | 12/2004 |
| JP | 3939445 B2 | 7/2007 |
| JP | 2009-264206 A | 11/2009 |
| JP | 2012-013040 A | 1/2012 |
| WO | WO 2013/107714 A1 | 7/2013 |
| WO | WO 2013/157074 A1 | 10/2013 |

* cited by examiner

APPARATUS AND METHOD FOR DRIVING A SWITCHING ELEMENT, AND A VEHICLE AIR-CONDITIONING APPARATUS

TECHNICAL FIELD

The present invention relates to an apparatus and method for driving a switching element, and to a vehicle air conditioning apparatus.

Background Art

Electric vehicles (EVs), for example, do not include internal combustion engines, and thus cannot use engine waste heat for heating purposes. Meanwhile, hybrid electric vehicles (HEVs) and plug-in hybrid electric vehicles (PHEVs) do include engines, but such vehicles are configured to control the engine to stop as often as possible in order to conserve fuel. As such, heat pump heating that utilizes a refrigerant or an electric heater is being considered for heating purposes.

Running a heater consumes a large amount of power, and thus a heat pump system having a high coefficient of performance (COP) is desirable as a system for running a heater. This is because the COP of an electric heater has a COP lower than 1. However, when heat pump heating is performed at a low outside temperature (−10° C., for example), it is possible that moisture in the air will condense and produce frost on an outside heat exchanger, leading to a drop in the heating performance.

When frost is produced in a household room air conditioner or the like, the outside heat exchanger is defrosted through reverse operation (that is, changing from heating operation to cooling operation). However, carrying out the same type of defrosting in a vehicle heat pump system causes the heating operation to stop.

To solve this problem, in an automobile cooling and heating apparatus disclosed in Patent Document 1, a hot water-refrigerant heat exchanger is disposed on a refrigerant outlet side of an outside heat exchanger (a main condenser) that functions as an evaporator. Then, in the case where low outside air temperatures have caused the outside heat exchanger to become frosted, the automobile cooling and heating apparatus ensures the required heating performance by using the hot water-refrigerant heat exchanger to heat a refrigerant by the amount of heat that cannot be absorbed in the outside heat exchanger and evaporate the refrigerant.

CITATION LIST

Patent Literature

Patent Document 1: Japanese Patent No. 3939445B

SUMMARY OF INVENTION

Technical Problem

However, the automobile cooling and heating apparatus according to Patent Document 1 requires a hot water vessel including a sheathed heater that heats the hot water, a pipe, a pump, and the like for supplying the hot water to the hot water-refrigerant heat exchanger, and the like in addition to the hot water-refrigerant heat exchanger. As such, the automobile cooling and heating apparatus disclosed in Patent Document 1 has an increased number of components, which increases the weight and costs as well.

The above-described problem of increased weight and costs are not limited to a vehicle air conditioning apparatus, and also arise in apparatuses that require a heat source for some reason.

An object of the present invention is to provide an apparatus and method for driving a switching element, and a vehicle air conditioning apparatus, that can secure a heat source while suppressing an increase in weight and costs.

Solution to Problem

The first aspect of the present invention is a drive apparatus for driving a switching element constituted by a transistor that includes a high-heat resistant semiconductor such as silicon carbide. Such an apparatus includes: a voltage adjusting unit configured to vary a driving voltage to be applied to a conduction control terminal of the switching element in order to put the switching element in an on state. In the apparatus, the voltage adjusting unit applies, as the driving voltage, a voltage in an active region of the transistor to the conduction control terminal.

According to the above-described aspect, a voltage in the active region of the transistor is applied, as a driving voltage, to the conduction control terminal of the switching element constituted by a transistor that includes a high-heat resistant semiconductor such as silicon carbide. This allows switching loss to be increased as compared to a case where a voltage in a saturation region is applied to the conduction control terminal to drive the switching element, which increases the amount of heat generation. Using this heat as a heat source makes it possible to suppress an increase in weight and costs.

"Varying the driving voltage" is also assumed to include a case where two values are switched and outputted, or in other words, a voltage in the saturation region and a voltage in the active region are switched and outputted.

It is preferable to employ a configuration in which heat generated by the switching element is conducted easily to, for example, a medium to be heated, so that the heat generated by the switching element can be used effectively.

The above-described drive apparatus may include a mode switching unit configured to switch between a normal mode and a heat generating mode. The voltage adjusting unit may apply, as the driving voltage, a voltage in the saturation region of the transistor to the conduction control terminal in the normal mode, and may apply, as the driving voltage, a voltage in the active region of the transistor to the conduction control terminal in the heat generating mode.

The above-described configuration causes the switching element to be heated and allows the generated heat to be applied only in the case where a heat source is necessary. Meanwhile, in the normal mode, the switching element is driven in the saturation region, which makes it possible to improve the switching efficiency.

The above-described drive apparatus may include a current sensing unit configured to detect a current flowing in the switching element, and information associating a value of the current flowing in the switching element with the voltage value. In the heat generating mode, the voltage adjusting unit may obtain a voltage value corresponding to the current value detected by the current detecting unit from the information and apply a voltage corresponding to the obtained voltage value to the conduction control terminal.

If the amount of heat and current value required in the heat generating mode are found, the driving voltage can be determined uniquely. Accordingly, finding a relationship between the current value and the driving voltage for obtaining a given amount of heat and determining the driving voltage from the current measurement value on the basis of that relationship makes it possible to obtain the desired amount of heat.

The above-described drive apparatus may include a temperature sensing unit configured to detect an ambient temperature of the switching element. In the heat generating mode, when the temperature detected by the temperature sensing unit exceeds a predetermined threshold, the voltage adjusting unit may apply a driving voltage for the normal mode to the conduction control terminal.

According to the above-described configuration, the drive voltage is switched to a driving voltage for the normal mode, which generates less heat, in the case where the temperature of the switching element has exceeded the threshold, which makes it possible to prevent damage to the element.

The second aspect of the present invention is a vehicle air conditioning apparatus. Such an apparatus includes: a heat pump cycle for heating operation that is formed by connecting an electric compressor that compresses a refrigerant, a vehicle cabin interior condenser, a throttling valve, and a vehicle cabin outside heat exchanger in that order through a refrigerant pipe; an inverter for driving a motor of the electric compressor, the inverter including a switching element constituted by a transistor that includes a high-heat resistant semiconductor such as silicon carbide; and a drive apparatus of the inverter including the above-described drive apparatus. The inverter is installed in the electric compressor so that the refrigerant compressed by the electric compressor is heatable by heat generated by the switching element, and the mode switching unit sets the heat generating mode during the heating operation of the heat pump cycle.

According to this aspect, the refrigerant can be heated by the heat generated by the switching element. This makes it possible to secure a heat source for heating the refrigerant while suppressing an increase in weight and costs.

The third aspect of the present invention is a drive method for driving a switching element constituted by a transistor that includes a high-heat resistant semiconductor such as silicon carbide. The method includes the step of varying a driving voltage applied to a conduction control terminal of the switching element and applying, as the driving voltage, a voltage in the active region of the transistor to the conduction control terminal.

Advantageous Effects of Invention

The present invention provides an effect of enabling a heat source to be secured while suppressing an increase in weight and costs.

DESCRIPTION OF EMBODIMENTS

An embodiment in which an apparatus and method for driving a switching element according to the present invention is applied to a vehicle air conditioning apparatus will be described hereinafter with reference to the drawings.

Figure 1:
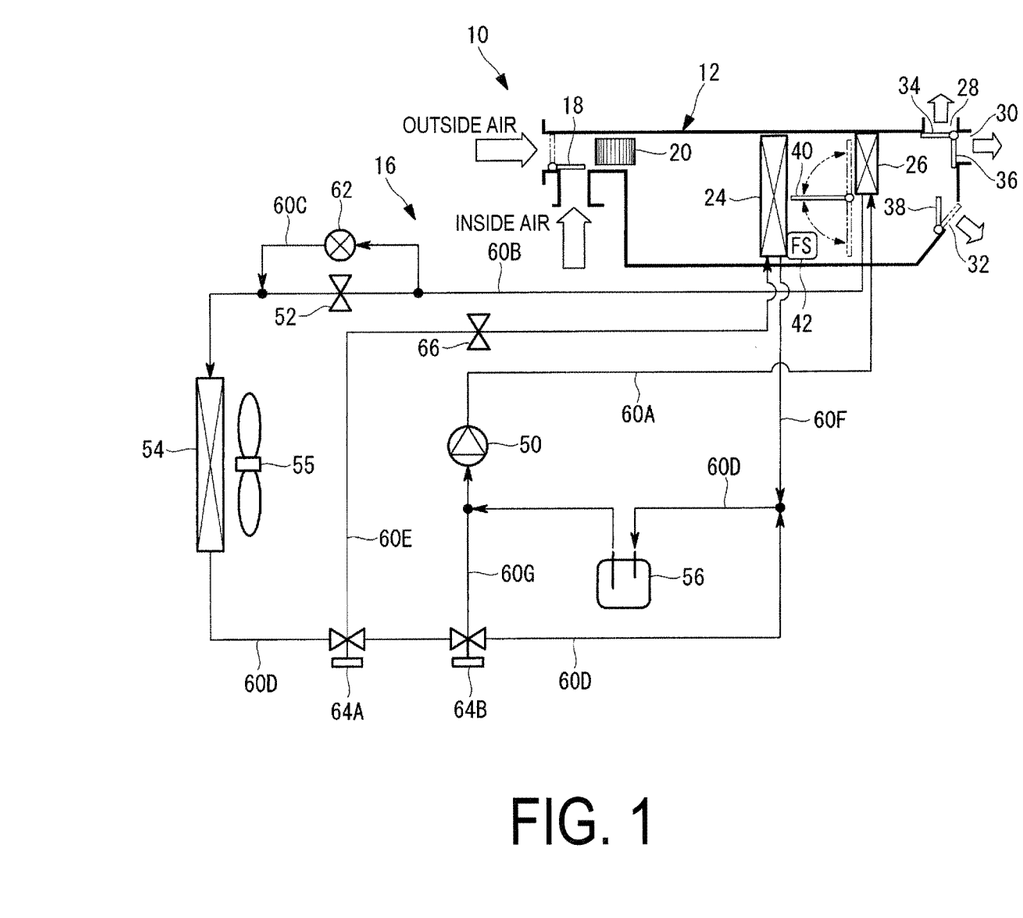
FIG. 1 is a diagram illustrating a refrigerant circuit in a heat-pump-type vehicle air-conditioning apparatus according to an embodiment of the present invention.

FIG. 1 is a diagram illustrating a refrigerant circuit in a vehicle air conditioning apparatus 10 according to the embodiment of the present invention.

The vehicle air conditioning apparatus 10 according to the present embodiment includes a heating ventilation and air conditioning (HVAC) unit 12 and a heat pump cycle 16 capable of cooling and heating.

The HVAC unit 12 includes a blower 20 that introduces inside air from within a vehicle cabin or introduces outside air from outside the vehicle cabin, which is switched by an inside/outside air switching damper 18, and blows the air downstream, and a vehicle cabin interior vaporizer 24 and a vehicle cabin interior condenser 26 disposed in that order from an upstream side to a downstream side in an air flow channel continuing from the blower 20. This HVAC unit 12, which is installed within an instrument panel in a vehicle cabin, is configured to adjust the air within the vehicle cabin to a setting temperature by blowing air that has been temperature-adjusted by the vehicle cabin interior vaporizer 24 and the vehicle cabin interior condenser 26 into the vehicle cabin in accordance with a blow out mode selectively switched by blow out mode switching dampers 34, 36, and 38, from any of a plurality of defroster air vent 28, face air vent 30, and foot air vent 32 that open toward the vehicle cabin interior. An air mix damper 40 is disposed rotatably between the vehicle cabin interior vaporizer 24 and the vehicle cabin interior condenser 26 so that the flow rate of air flowing into the vehicle cabin interior condenser 26 can be controlled. A blown air temperature sensor (FS) 42 is also provided in the HVAC unit 12.

The heat pump cycle 16, which is capable of cooling and heating, includes a heating operation cycle in which an electric compressor 50 that compresses a refrigerant, the vehicle cabin interior condenser 26, a throttling valve 52 (an expansion valve), and a vehicle cabin outside heat exchanger 54 are connected in that order by a refrigerant pipe 60. Note that an accumulator 56 is connected between the vehicle cabin outside heat exchanger 54 and the electric compressor 50.

In other words, a discharge pipe 60A connected to a refrigerant outlet of the electric compressor 50 is connected to the vehicle cabin interior condenser 26, and the vehicle cabin interior condenser 26 is connected by a refrigerant pipe 60B to the vehicle cabin outside heat exchanger 54 via the throttling valve 52. A bypass pipe 60C that bypasses the throttling valve 52 is provided in the refrigerant pipe 60B, and the bypass pipe 60C is provided with a switching valve 62. In the present embodiment, a fixed throttle valve such as a capillary is employed as the throttling valve 52, but the valve is not limited thereto, and a thermostatic automatic expansion valve may be employed as well.

The vehicle cabin outside heat exchanger 54 is connected to a refrigerant inlet of the electric compressor 50 by a refrigerant pipe 60D, via the accumulator 56. The vehicle cabin outside heat exchanger 54 exchanges heat with the refrigerant by feeding outside air using a vehicle cabin exterior fan 55.

A three-way switching valve 64A and a three-way switching valve 64B are provided, in that order from the vehicle cabin outside heat exchanger 54, in the refrigerant pipe 60D that connects the vehicle cabin outside heat exchanger 54 and the accumulator 56. It is possible for the three-way switching valves 64A and 64B to be replaced with a configuration that combines two solenoid valves, for example.

A refrigerant pipe 60E is connected to the three-way switching valve 64A, the vehicle cabin interior vaporizer 24 is connected to the refrigerant pipe 60E via a throttling valve 66, and the vehicle cabin interior vaporizer 24 is connected to the accumulator 56 via a refrigerant pipe 60F.

In the present embodiment, like the throttling valve 52, a fixed throttle valve such as a capillary is employed as the throttling valve 66, but the valve is not limited thereto, and a thermostatic automatic expansion valve may be employed as well.

A bypass pipe 60G is connected to the three-way switching valve 64B, and the bypass pipe 60G is connected to the refrigerant inlet of the electric compressor 50. In other words, the bypass pipe 60G bypasses the accumulator 56 and connects the vehicle cabin outside heat exchanger 54 and the electric compressor 50.

In the above-described heat pump cycle 16, a refrigerating cycle for heating operation is configured by closing the switching valve 62 which causes refrigerant to pass through the three-way switching valve 64A, and connecting the vehicle cabin outside heat exchanger 54 and the electric compressor 50 via the accumulator 56 using the three-way switching valve 64B.

On the other hand, a refrigerating cycle for cooling operation is configured by opening the switching valve 62 and connecting the vehicle cabin outside heat exchanger 54 and the vehicle cabin interior vaporizer 24 using the three-way switching valve 64A.

Figure 2:
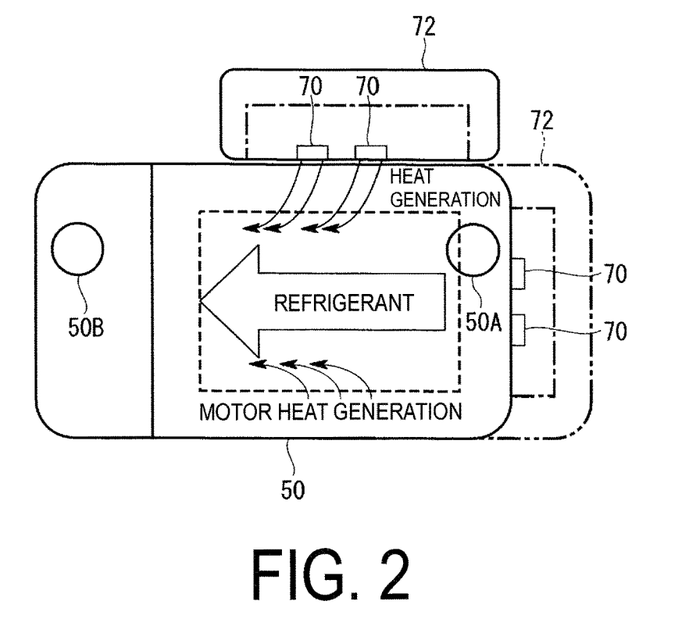
FIG. 2 is a schematic configuration diagram illustrating an electric compressor according to the embodiment of the present invention.

FIG. 2 is a schematic configuration diagram illustrating the electric compressor 50 according to the present embodiment.

An inverter 72, in which a power element (switching element) 70 constituted by a transistor using a semiconductor having superior high-heat resistance (an insulated gate bipolar transistor (IGBT), for example) is used, is installed in the electric compressor 50. In other words, the electric compressor 50 is integrated with the inverter 72.

The high-heat resistant semiconductor device that constitutes the power element 70 is a semiconductor device having a higher-heat resistance than conventional semiconductor devices formed from Si or the like. However, the high-heat resistant semiconductor device may be any semiconductor device capable of withstanding a rise in the temperature of the refrigerant.

Although silicon carbide (SiC) is one example of a high-heat resistant semiconductor device, the device is not limited thereto, and a gallium nitride-based semiconductor or a diamond-based semiconductor may be used as well.

The inverter 72 is installed in the electric compressor 50 so that the refrigerant compressed by the electric compressor 50 can be heated by the heat generated by the power element 70. In other words, the refrigerant is heated by heat generated by the power element 70 and heat generated by a motor of the electric compressor 50 between a refrigerant inlet 50A and a refrigerant outlet 50B of the electric compressor 50.

The power element 70 composed of a high-heat resistant semiconductor device is capable of heating the refrigerant using heat generated by the high-heat resistant semiconductor device itself. In other words, the vehicle air conditioning apparatus 10 employs a high-heat resistant semiconductor device as the power element 70 used in the inverter 72, and uses that device as a heat source that heats the refrigerant during heating operation of the heat pump cycle 16.

Although the installation position of the inverter 72 depends on the vehicle design, it is preferable that the inverter 72 be installed near the refrigerant inlet 50A on a side surface (the solid line in FIG. 2), a rear surface (the dashed line in FIG. 2), or the like of the electric compressor 50.

The use of a high-heat resistant semiconductor device as the power element 70 allows the reliability of not only the electric compressor 50 but also the vehicle air conditioning apparatus 10 to be improved.

Figure 3:
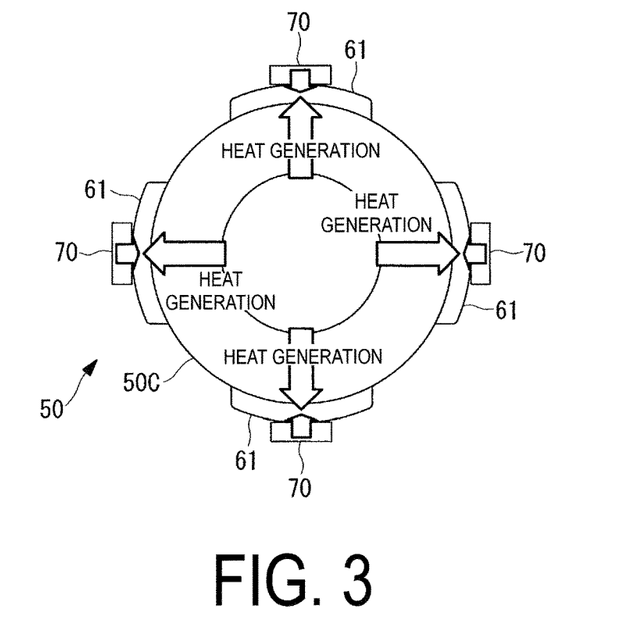
FIG. 3 is a schematic cross-sectional view illustrating the electric compressor according to the embodiment of the present invention.

FIG. 3 is a schematic cross-sectional view illustrating the electric compressor 50 according to the present embodiment.

As illustrated in FIG. 3, a refrigerant flow channel 61 connected to the discharge pipe 60A and the bypass pipe 60G is installed so as to be in contact with a surface of a motor 50C of the electric compressor 50, and the power element 70 is installed so as to be in contact with the refrigerant flow channel 61. As a result, the refrigerant flowing in the refrigerant flow channel 61 is heated by the power element 70 and the motor 50C. Likewise, the power element 70 and the motor 50C are cooled by the refrigerant.

"Contact" as used here may refer to either direct contact or indirect contact. Although the number of power elements 70 installed on the refrigerant flow channel 61 and the locations thereof are not limited, there may be four, as indicated in FIG. 3, or may be one.

Figure 4:
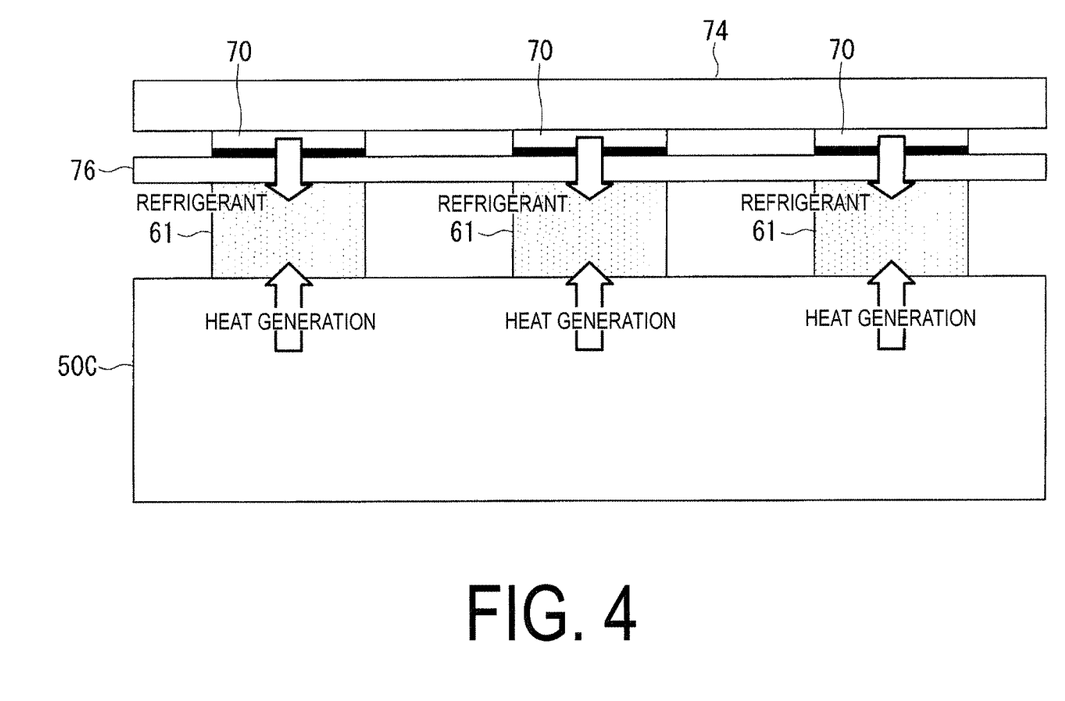
FIG. 4 is a detailed cross-sectional view illustrating a location where power elements are disposed in the electric compressor, according to the embodiment of the present invention.

FIG. 4 is a detailed cross-sectional view illustrating locations where the power elements 70 are disposed in the electric compressor 50.

As illustrated in FIG. 4, a control circuit board 74 is disposed on the upper portion of the power elements 70.

The power element 70 makes contact with the refrigerant flow channel 61 through a housing (an aluminum housing, for example) 76 that houses the power elements 70 and the control circuit board 74.

The refrigerant flow channel 61 is split into a plurality of branches, for example, which make contact with the motor 50C in parallel. The power elements 70 are installed so as to correspond to the respective branches of the refrigerant flow channel 61. Note that rather than having a plurality of branches, the refrigerant flow channel 61 may make contact with the motor 50C in series.

A configuration that increases heat conductivity from the power element 70 to the housing 76, such as a thermal grease, a heat conductive sheet, or the like, is provided as appropriate between the housing 76 and the power element 70, between the housing 76 and the refrigerant flow channel 61, and between the refrigerant flow channel 61 and the motor 50C.

In the case where a copper inlay substrate, a heat dissipating substrate, or the like is used as the control circuit board 74, the control circuit board 74 is disposed on a lower portion of the power element 70, and the power element 70 makes contact with the control circuit board 74 and the housing 76. In other words, heat from the power element 70 is conducted to the refrigerant via the control circuit board 74 and the housing 76.

Next, an apparatus and method for driving the power element 70 that constitutes the above-described inverter 72 will be described with reference to FIGS. 5 through 8.

Figure 5:
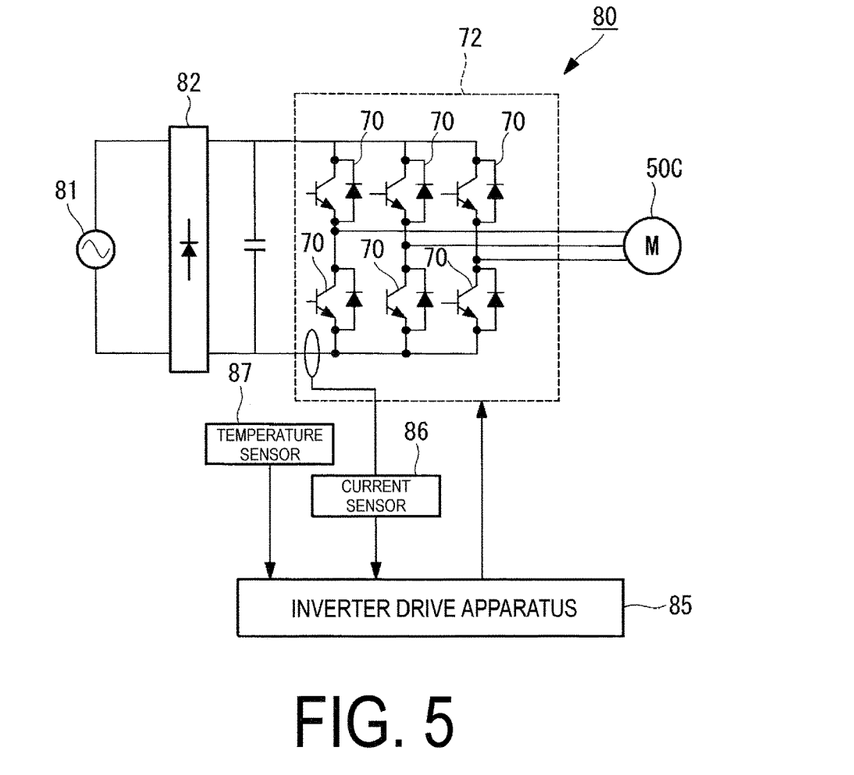
FIG. 5 is a diagram schematically illustrating the configuration of a motor drive apparatus according to the embodiment of the present invention.

FIG. 5 is a diagram schematically illustrating the configuration of a motor drive apparatus 80 that includes the inverter 72 and drives the motor 50C. As illustrated in FIG. 5, the motor drive apparatus 80 includes, as primary constituent elements, a converter 82 that converts AC power supplied from an AC power source 81 into DC power and outputs the DC power, the inverter 72 that converts the DC power outputted from the converter 82 into three-phase AC power and supplies that power to the motor 50C of the electric compressor 50, and an inverter drive apparatus 85 that drives the inverter 72. A current sensor 86 that measures a current flowing in the power elements 70 and a temperature sensor 87 that measures the ambient temperature of the inverter 72 are provided in the inverter 72. The current sensor 86 may be provided in correspondence with each of the arms that constitute the inverter 72, or as illustrated in FIG. 5, a single current sensor 86 may be provided for the inverter 72. The inverter drive apparatus 85 is mounted on the above-described control circuit board 74.

The inverter drive apparatus 85 includes a microprocessing unit (MPU), for example. The MPU has a computer-readable recording medium in which is recorded a program for causing each of the processes described below to be executed, and the processes described below are each realized by the MPU loading the program recorded in this recording medium into a main memory device such as a RAM and executing that program. Examples of the computer-readable recording medium include a magnetic disk, a magneto-optical disk, a semiconductor memory, and the like.

Figure 6:
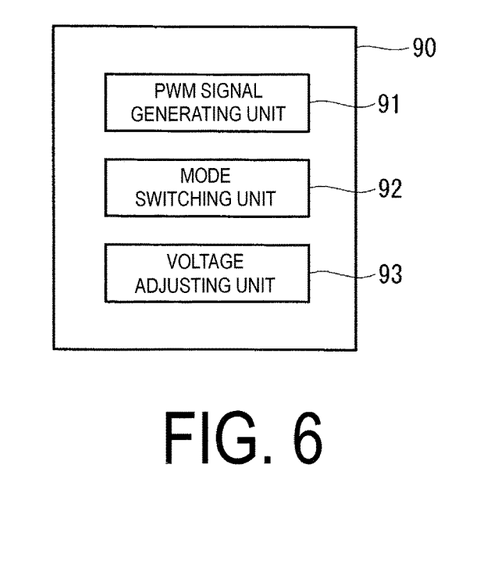
FIG. 6 is a function block diagram illustrating an inverter drive apparatus according to the embodiment of the present invention.

FIG. 6 is a function block diagram illustrating an MPU 90 provided in the inverter drive apparatus 85. As illustrated in FIG. 6, the MPU 90 primarily includes a pulse width modulation (PWM) signal generating unit 91, a mode switching unit 92, and a voltage adjusting unit 93.

The PWM signal generating unit 91 generates a PWM signal that causes a motor speed to match a motor speed instruction inputted from a host unit (not illustrated). Any known technique can be employed as appropriate as a method for generating the PWM signal, and thus details thereof will not be given here.

The mode switching unit 92 switches between a normal mode and a heat generating mode. For example, the mode switching unit 92 sets the normal mode during cooling operation and normal heating operation, which will be described later, and sets the heat generating mode during heating operation using power element heat source, which will be described later.

The voltage adjusting unit 93 adjusts a driving voltage applied to a conduction control terminal of the power element 70 (a gate terminal, in the case where the power element 70 is an IGBT, for example) in order to put the power element 70 in an on state. To be more specific, in the case where the normal mode has been selected by the mode switching unit 92, the voltage adjusting unit 93 applies a predetermined voltage in the saturation region of the power element 70 (15 V, for example), as the driving voltage. On the other hand, in the case where the heat generating mode is set, a voltage in the active region of the power element 70 is applied as the driving voltage.

For example, the voltage adjusting unit 93 has a table in which values of currents flowing in the power element 70 and driving voltages applied to the conduction control terminal, for achieving predetermined amounts of heat generation, are associated with each other, and in the heat generating mode, the driving voltage value corresponding to the current value measured by the current sensor is obtained from the table and a voltage corresponding to the obtained driving voltage value is applied to the conduction control terminal.

Figure 7:
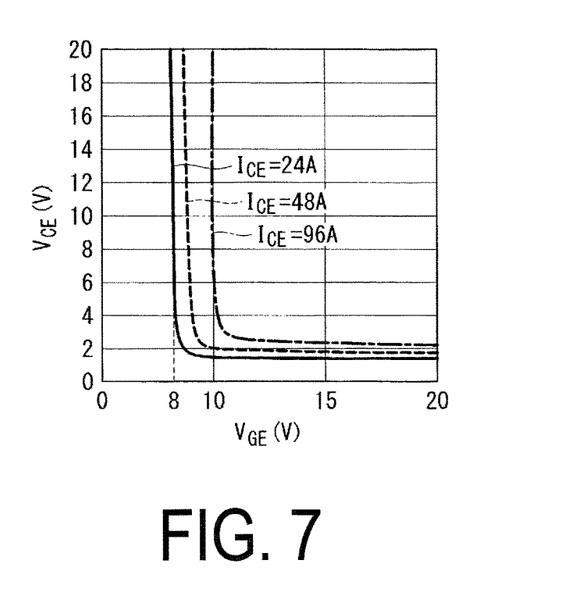
FIG. 7 is a graph showing typical insulated gate bipolar transistor (IGBT) characteristics.

FIG. 7 illustrates typical IGBT characteristics. In FIG. 7, the horizontal axis represents a gate-emitter voltage and the vertical axis represents a collector-emitter voltage, and respective voltage characteristics occurring when a collector-emitter current is changed are indicated. From FIG. 7, it can be seen that a high collector-emitter voltage is obtained when the gate-emitter voltage drops from the saturation region (15 V, for example) to the active region (approximately 12 V or less, for example).

For example, in the case where a gate-emitter voltage of approximately 8 V is applied when the collector-emitter current is 24 A, the collector-emitter voltage becomes 8 V, and thus the amount of heat equivalent to 8 V×24 A=192 W of power can be generated. On the other hand, in the case where 15 V is applied for the gate-emitter voltage, the collector-emitter voltage is approximately 2 V; thus in this case, the power is 2 V×24 A=48 W, which is much lower than when operating in the active region as described above.

In the case where the temperature measured by the temperature sensor 87 has exceeded a predetermined threshold while in the heat generating mode, the voltage adjusting unit 93 applies a driving voltage for the normal mode to the conduction control terminal. In this manner, the driving voltage is switched to a driving voltage for the normal mode, which generates less heat (15 V, for example), in the case where the temperature of the power element 70 has exceeded a threshold, which makes it possible to prevent damage to the element.

Figure 8:
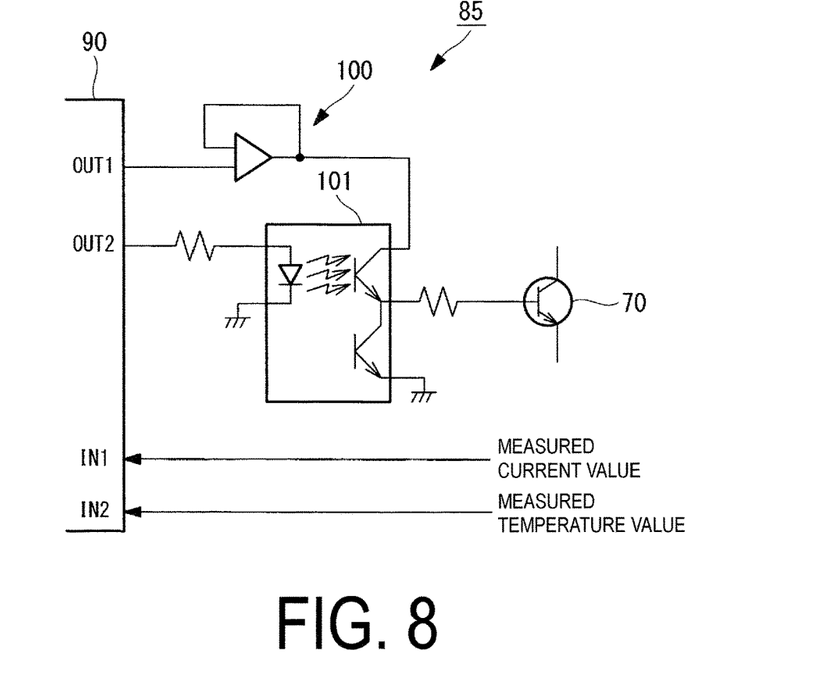
FIG. 8 is a diagram illustrating an example of the configuration of the inverter drive apparatus according to the embodiment of the present invention.

FIG. 8 is a diagram illustrating an example of the specific configuration of the inverter drive apparatus 85. Although FIG. 8 illustrates a configuration that drives a single power element 70 as an example for the sake of simplicity, this configuration is provided for each of the power elements 70.

As illustrated in FIG. 8, a current measurement value is inputted to a terminal IN1 of the MPU 90, and a temperature measurement value is inputted to a terminal IN2. In the MPU 90, in the case where the normal mode is set by the mode switching unit 92, the voltage adjusting unit 93 outputs a voltage corresponding to a predetermined value in the saturation region, such as 5 V, from a terminal OUT1. The 5 V outputted from the terminal OUT1 is amplified threefold by a voltage follower 100, and a voltage of 15 V is outputted. On the other hand, the PWM signal generated by the PWM signal generating unit 91 is outputted from a terminal OUT2 of the MPU 90. Driving a gate driver 101 on the basis of this PWM signal causes a voltage of 15 V to be applied to the conduction control terminal of the power element 70.

In the case where the heat generating mode is set by the mode switching unit 92, the voltage adjusting unit 93 obtains a voltage value corresponding to the current measurement value inputted from the terminal IN1 from the above-described table and outputs a voltage based on the obtained voltage value from the terminal OUT1. In other words, in the present embodiment, the voltage follower 100 amplifies the input voltage threefold, and thus the voltage adjusting unit 93 outputs a voltage corresponding to a value obtained by dividing the voltage value obtained from the table by 3. Through this, the output of the voltage follower 100 is taken as the voltage value obtained from the table, and driving the gate driver 101 on the basis of the PWM signal causes a driving voltage corresponding to a voltage value based on the current measurement value to be applied to the conduction control terminal of the power element 70.

In the case where the heat generating mode is set, the voltage adjusting unit 93 monitors whether or not the temperature measurement value inputted from the terminal IN2 has exceeded a predetermined threshold, and in the case where the threshold has been exceeded, switches the voltage outputted from the terminal OUT1 to the voltage for the normal mode.

Next, a flow of refrigerant during operation of the above-described heat-pump-type vehicle air conditioning apparatus 10 will be described using FIGS. 9 through 11. Note that a refrigerant flow path during operation is indicated by bold lines in each of the drawings.

[Cooling Operation]

During cooling operation, the switching valve 62 is controlled to a fully-open state, and the vehicle cabin outside heat exchanger 54 and the vehicle cabin interior vaporizer 24 are connected by the three-way switching valve 64A. Meanwhile, the air mix damper 40 is in a position that does not allow air to flow to the vehicle cabin interior condenser 26. Note that in the case where temperature adjustment by the HVAC unit 12 is necessary, the air mix damper 40 is opened as appropriate, and the temperature of air blown into the vehicle cabin is adjusted.

Figure 9:
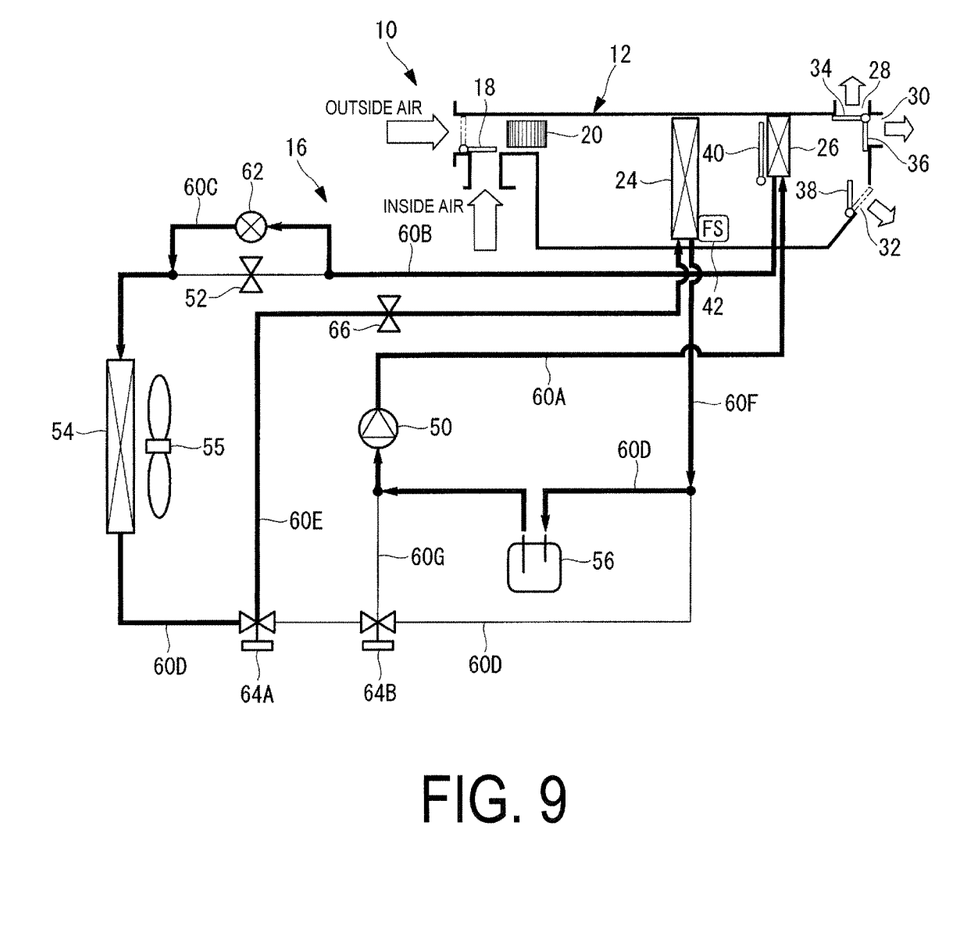
FIG. 9 is a diagram of the refrigerant circuit, illustrating a flow of refrigerant during cooling operation in the heat-pump-type vehicle air conditioning apparatus according to the embodiment of the present invention.

As a result, as illustrated in FIG. 9, refrigerant compressed by the electric compressor 50 flows through the vehicle cabin interior condenser 26, bypasses the throttling valve 52, and flows into the vehicle cabin outside heat exchanger 54. Then, the refrigerant exchanges heat with the outside air fed by the vehicle cabin exterior fan 55 to be condensed and liquefied. Then, the refrigerant is decompressed, by the throttling valve 66, into a gas-liquid two-phase state, and is supplied to the vehicle cabin interior vaporizer 24. In the vehicle cabin interior vaporizer 24, the refrigerant exchanges heat with inside air or a mix of inside and outside air blown from the blower 20 to be vaporized into a gas; the refrigerant then flows into the accumulator 56, is temporarily held therein, and is then taken into the electric compressor 50 and recompressed. The same cycle is repeated thereafter.

In the vehicle cabin interior vaporizer 24, the inside air or mix of inside and outside air are cooled through the exchange of heat with the refrigerant is blown into the vehicle cabin from one of the defroster air vent 28, the face air vent 30, and the foot air vent 32 in accordance with the blow out mode switched by the blow out mode switching dampers 34, 36, and 38, which is used for cooling the vehicle cabin.

[Normal Heating Operation]

During normal heating operation, the switching valve 62 is controlled to a fully-closed state, and the vehicle cabin outside heat exchanger 54 and the electric compressor 50 are connected via the accumulator 56 by the three-way switching valves 64A and 64B. Meanwhile, the air mix damper 40 is in a position that allows air to flow to the vehicle cabin interior condenser 26.

Figure 10:
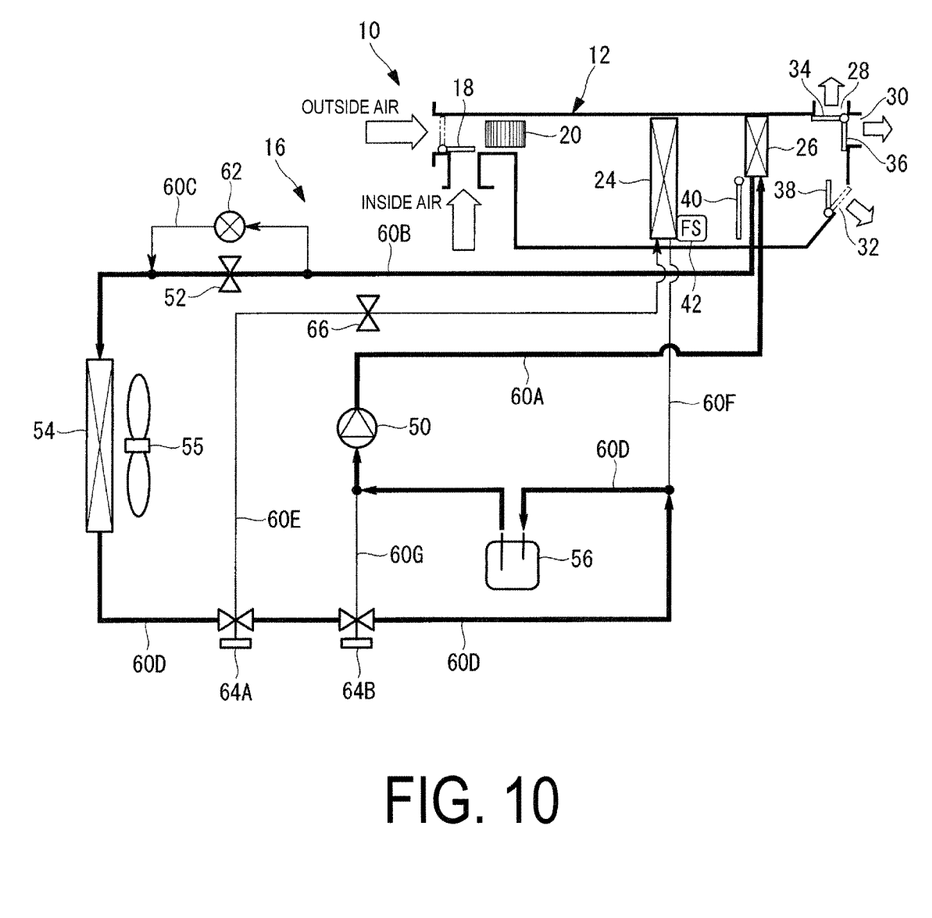
FIG. 10 is a diagram of the refrigerant circuit, illustrating a flow of refrigerant during heating operation in the heat-pump-type vehicle air conditioning apparatus according to the embodiment of the present invention.

As a result, as illustrated in FIG. 10, refrigerant compressed by the electric compressor 50 flows into the vehicle cabin interior condenser 26 from the discharge pipe 60A, and exchanges heat with inside air or a mix of inside and outside air blown from the blower 20 in the vehicle cabin interior condenser 26, which causes heat to be released from the refrigerant. The air thus heated is blown into the vehicle cabin from one of the defroster air vent 28, the face air vent 30, and the foot air vent 32 in accordance with the blow out mode, which is used for heating the vehicle cabin.

The refrigerant that has released heat to be condensed and liquefied in the vehicle cabin interior condenser 26 is conveyed to the throttling valve 52, depressurized into a gas-liquid two-phase state, and supplied to the vehicle cabin outside heat exchanger 54. The refrigerant exchanges heat with the outside air fed by the vehicle cabin exterior fan 55 to be a two-phase vapor gas. The refrigerant is then introduced into the refrigerant inlet of the electric compressor 50 via the accumulator 56 and is recompressed. The same cycle is repeated thereafter.

[Heating Operation Using Power Element Heat Source]

Heating operation using power element heat source is carried out in the case where the refrigerant is heated by heat generated by the power element 70, using the power element 70 as a heat source. Note that the heating operation using power element heat source is carried out in the case where, for example, the outside air temperature has dropped to a temperature that necessitates defrosting of the vehicle cabin outside heat exchanger 54.

Figure 11:
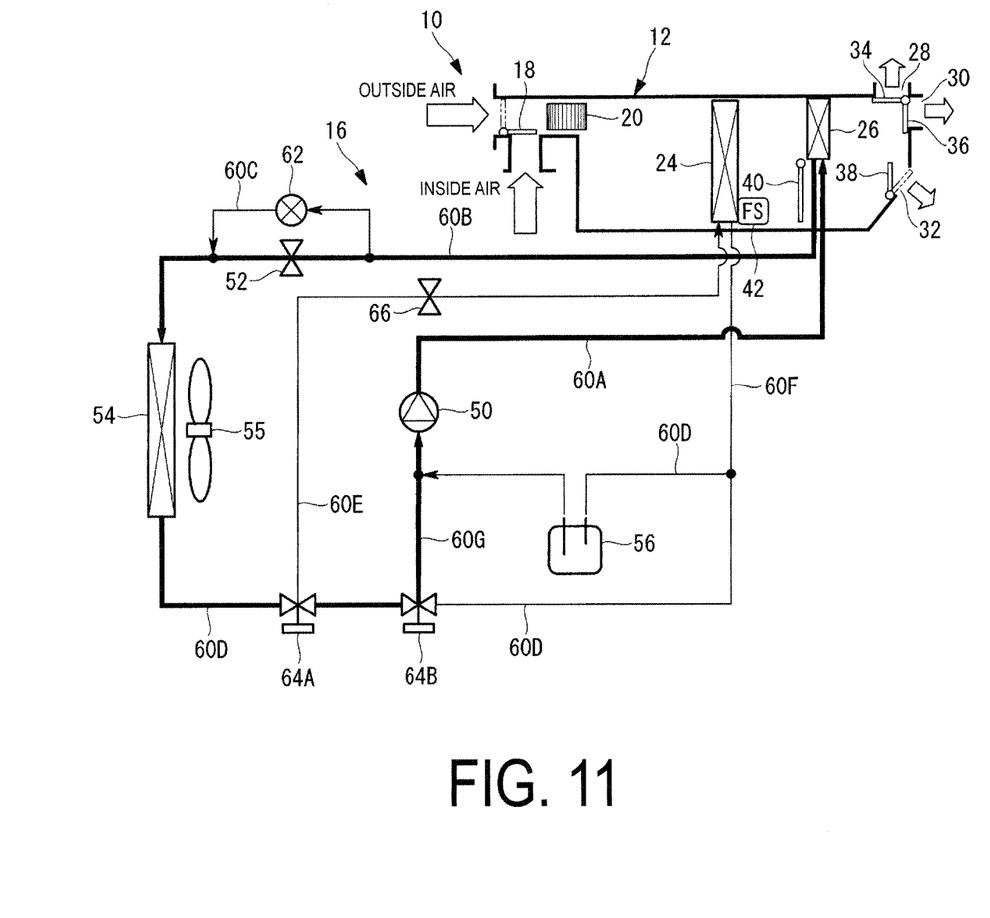
FIG. 11 is a diagram of the refrigerant circuit, illustrating a flow of refrigerant during heating operation using power element heat source in the heat-pump-type vehicle air conditioning apparatus according to the embodiment of the present invention.

Although the heating operation using power element heat source is similar to the normal operation, the three-way switching valve 64B causes the refrigerant to bypass the accumulator 56 and then to be introduced into the electric compressor 50, as illustrated in FIG. 11.

Through this, the refrigerant is introduced into the electric compressor 50 in a liquid-rich two-phase state, without passing through the accumulator 56. The reason the refrigerant becomes liquid-rich is that the outside air temperature is low and the refrigerant cannot absorb a sufficient amount of heat in the outside heat exchanger 54, and as a result, the refrigerant cannot sufficiently evaporate. The refrigerant has a higher heat conductivity when in a liquid-rich state than in a gas state. Accordingly, the liquid-rich refrigerant can absorb the heat generated by the power element 70 efficiently.

In this mode, the heat generating mode is set by the mode switching unit 92 in the inverter drive apparatus 85. As a result, the voltage adjusting unit 93 applies, to the conduction control terminal of the power element 70, a driving voltage corresponding to a voltage value in the active region based on the current measurement value taken by the current sensor 86. Accordingly, the power element 70 can generate more heat than in the normal mode, where a voltage in the saturation region is applied to the conduction control terminal. The refrigerant can be heated by this heat generated by the power element 70.

As described above, according to the vehicle air conditioning apparatus 10 of the present embodiment, a voltage in the active region is applied to the conduction control terminal of the power element 70 in the heat generating mode, in which heat is required; as such, the power element 70 can generate more heat than in the normal mode, where a voltage in the saturation region is applied to the conduction control terminal. Through this, a heat source can be secured while suppressing an increase in weight and costs, and thus the refrigerant heating performance can be improved.

Although the present invention has been described using the above-described embodiment, the technical scope of the present invention is not intended to be limited to that described in the above-described embodiment. Various modifications or improvements can be added to the above-described embodiment without departing from the essential spirit of the invention, and any embodiment to which such modifications or improvements have been added also fall within the technical scope of the present invention.

In other words, although in the above-described embodiment, an example in which the apparatus and method for driving a switching element according to the present invention is applied to the vehicle air conditioning apparatus 10 has been described, the present invention is not limited to such an embodiment, and the apparatus and method for driving a switching element according to the present invention can be applied to other products that have switching elements and require a heat source to be secured. Even in vehicle air conditioning apparatuses, switching elements are used in components aside from the above-described inverter. For example, in the case where the refrigerant is heated using an electric heater, a switching element is used in on/off control of the electric heater. The apparatus and method for driving a switching element according to the present invention may also be used for such a switching element, and the refrigerant may be heated by heat generated by the switching element.

Although in the above-described embodiment, the heat generating mode is set during heating operation using power element heat source, the heat generating mode may be set during normal heating operation as well.

REFERENCE SIGNS LIST

10 Vehicle air conditioning apparatus
16 Heat pump cycle
26 Vehicle cabin interior condenser
50 Electric compressor
52 Throttling valve
54 Vehicle cabin outside heat exchanger
56 Accumulator
60 Refrigerant pipe
60G Bypass pipe
70 Power element
72 Inverter
80 Motor drive apparatus
85 Inverter drive apparatus
86 Current sensor
87 Temperature sensor
90 MPU
91 PWM signal generating unit
92 Mode switching unit
93 Voltage adjusting unit
100 Voltage follower
101 Gate driver

The invention claimed is:

1. A drive apparatus for driving a switching element, the switching element including a transistor having a high-heat resistant semiconductor including silicon carbide, the apparatus comprising:
   a voltage adjusting unit configured to vary a driving voltage, the driving voltage being applied to a conduction control terminal of the switching element in order to put the switching element in an ON state;
   a mode switching unit configured to switch between a normal mode and a heat generating mode; and
   a temperature sensing unit configured to detect an ambient temperature of the switching element;
   wherein, in the heat generating mode, when a temperature detected by the temperature sensing unit exceeds a predetermined threshold, the heat generating mode is switched to the normal mode by the mode switching unit, and
   wherein the voltage adjusting unit applies, as the driving voltage, a voltage in an active region of the transistor to the conduction control terminal in the heat generating mode, and applies, as the driving voltage, a voltage in a saturation region of the transistor to the conduction control terminal in the normal mode.

2. The drive apparatus according to claim 1, further comprising:
   a current sensing unit configured to detect a current flowing in the switching element;
   wherein, in the heat generating mode, the voltage adjusting unit obtains a voltage value corresponding to the current value detected by the current sensing unit from information associating a value of the current flowing in the switching element with the voltage value and applies a voltage corresponding to the obtained voltage value to the conduction control terminal.

3. A vehicle air conditioning apparatus comprising:
   a heat pump cycle for heating operation, the heat pump cycle being formed by connecting an electric compressor that compresses a refrigerant, a vehicle cabin interior condenser, a throttling valve, and a vehicle cabin outside heat exchanger in that order via a refrigerant pipe;
   an inverter for driving a motor of the electric compressor, the inverter including a switching element, the switching element being constituted by a transistor that includes a high-heat resistant semiconductor including silicon carbide; and
   a drive apparatus of the inverter including the drive apparatus according to claim 1;
   wherein the inverter is installed in the electric compressor so that the refrigerant compressed by the electric compressor is heatable by heat generated by the switching element; and
   the mode switching unit sets the heat generating mode during the heating operation of the heat pump cycle.

4. The vehicle air conditioning apparatus according to claim 3, wherein the mode switching unit sets the heat generating mode when an outside air temperature has dropped to a temperature that necessitates defrosting of the vehicle cabin outside heat exchanger during the heating operation of the heat pump cycle.

5. A drive method for driving a switching element, the switching element including a transistor having a high-heat resistant semiconductor including silicon carbide, the method comprising the step of;
   detecting an ambient temperature of the switching element;
   switching from a heat generating mode to a normal mode when the detected ambient temperature exceeds a predetermined threshold in the heat generating mode;

applying, as a driving voltage, a voltage in an active region of the transistor to a conduction control terminal of the switching element in the heat generating, mode; and applying, as the driving voltage, a voltage in a saturation region of the transistor to the conduction control terminal in the normal mode.

* * * * *